(12) United States Patent
Saadat et al.

(10) Patent No.: US 12,479,309 B2
(45) Date of Patent: Nov. 25, 2025

(54) ELECTRIC MACHINE UNIT, VEHICLE AND METHOD OF OPERATING AN ELECTRIC MACHINE UNIT

(71) Applicant: SEG Automotive Germany GmbH, Stuttgart (DE)

(72) Inventors: Nima Saadat, Stuttgart (DE); Enrico Carraro, Stuttgart (DE); Timm Lohmann, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 82 days.

(21) Appl. No.: 18/393,125

(22) Filed: Dec. 21, 2023

(65) Prior Publication Data

US 2024/0208335 A1 Jun. 27, 2024

(30) Foreign Application Priority Data

Dec. 22, 2022 (DE) .......................... 102022134593.9

(51) Int. Cl.
*B60L 15/00* (2006.01)
*B60L 15/04* (2006.01)
*H02P 27/06* (2006.01)

(52) U.S. Cl.
CPC ............. *B60L 15/007* (2013.01); *B60L 15/04* (2013.01); *H02P 27/06* (2013.01)

(58) Field of Classification Search
CPC ......... B60L 15/007; B60L 15/04; H02P 27/06
See application file for complete search history.

(56) References Cited

U.S. PATENT DOCUMENTS

| 10,773,922 B2* | 9/2020 | Jiang ....................... H02P 27/08 |
| 2019/0184837 A1* | 6/2019 | Najmabadi ............. H02P 27/06 |
| 2023/0041926 A1* | 2/2023 | Freitag .................... H02P 23/14 |

FOREIGN PATENT DOCUMENTS

| DE | 102019200996 A1 | 7/2020 |
| DE | 102021113094 A1 | 11/2022 |

\* cited by examiner

*Primary Examiner* — Rexford N Barnie
*Assistant Examiner* — Duc M Pham
(74) *Attorney, Agent, or Firm* — COZEN O'CONNOR

(57) ABSTRACT

An electric machine unit has an electric machine with two phase groups of at least one phase each and having a power converter, the power converter having two half-bridge groups of at least one half-bridge in each case, each phase group being assigned one half-bridge group, so that one half-bridge is provided per phase connection of the electrical machine. The power converter has DC voltage terminals which are configured for connection to an energy storage, the phase terminals of a first phase group each being connected via an AC switch to the respectively associated half-bridge of a first half-bridge group, the phase terminals of a second phase group each being connected to the respectively associated half-bridge of a second half-bridge group, DC-voltage-side terminals of the half-bridges of the second half-bridge group each being connected to the DC terminals via a DC switch.

15 Claims, 7 Drawing Sheets

ELECTRIC MACHINE UNIT, VEHICLE AND METHOD OF OPERATING AN ELECTRIC MACHINE UNIT

CROSS-REFERENCE TO RELATED APPLICATIONS

This application claims priority to German Patent Application No. 102022134593.9 filed Dec. 22, 2022, titled "Electric machine unit, vehicle and method of operating an electric machine unit," which is hereby incorporated by reference in its entirety.

TECHNICAL FIELD

The present invention relates to an electric machine unit comprising an electric machine and a power converter, a vehicle comprising such an electric machine unit, and a method of operating such an electric machine unit.

BACKGROUND

In electrical machines, in particular those used as motors and/or generators, and especially those used in vehicles, inverters (power converters) are used to rectify the alternating current generated or to alternate the direct current present. For this purpose, in particular, an energy storage device such as a battery is also provided, which can be charged via it or from which energy can be taken to operate the electric machine. In particular, if an electric machine is (also) used as a traction drive for a vehicle, it is usually necessary to be able to charge the energy storage device externally, e.g. from a (public or private) power grid.

SUMMARY

According to the invention, an electric machine unit, a vehicle and a method for operating such an electric machine unit with the features of the independent patent claims are proposed. Advantageous embodiments are the subject of the dependent claims and the following description.

The invention relates to electrical machines and associated converters or inverters and their operation. In the context of the invention, the combination of electric machine and associated converter shall be referred to as an electric machine unit. Typically, the converter is attached to one end of the electrical machine, but may also be attached to one side of the electrical machine. The electrical machine unit can be part of a vehicle, in particular also be used as a traction drive. Electrical machines that can be considered are, for example, synchronous machines, synchronous reluctance machines, induction machines, permanently excited machines and others. In the following, the electrical machine unit and its operation will be described in a comprehensive manner.

Typical electrical machines have e.g. three phases or a multiple thereof; in the context of the present invention, electrical machines with at least two galvanically separated phase groups of three phases each are of particular interest, e.g. with six, nine, twelve or 15 phases. Typically, three phases each form a group (phase group); the three phases of a group are also interconnected, e.g. in a star or delta connection. The phases (or phase windings) are inserted into a stator of the electrical machine (they thus form a stator winding). In principle, however, the invention can also be applied to two galvanically separated phase groups, each with at least one phase.

In addition, the electric machine has a rotor that can be permanently and/or externally excited. A preferred use is also in so-called high-voltage applications, in which the electric machine is operated with a voltage of e.g. 48 V or higher.

The converter has a half-bridge for each phase connection of the electrical machine. Whereas with three phases in a phase group each phase is assigned a phase connection, with only one or two phases in a phase group two phase connections are provided. Each phase group is assigned a half-bridge group. Thus, if there are two phase groups with three phases each, there are two half-bridge groups with three half-bridges each. A half-bridge in turn comprises two switches or switching elements (e.g. MOSFETs or IGBTs) whose center tap (tap between the two switches) is to be connected to the associated phase connection. The other two terminals—the DC-side terminals—of the half-bridges are connected, typically together, to one (positive or negative) DC terminal each. The power converter thus has DC voltage terminals, which in turn are set up for connection to an energy storage device such as a battery. Typically, a DC link capacitor is also provided between the DC voltage connections, possibly also for each half-bridge group. Preferably, such a converter is bidirectional, i.e. it can convert both DC voltage into AC voltage (for motor operation of the electric machine) and vice versa (for regenerative and possibly recuperative operation of the electric machine).

Typically, the half-bridges are electrically (directly) connected (via their center tap) to the associated phase or phase connection. In order to be able to charge the energy storage unit, which is located e.g. in a vehicle, externally—and not only via regenerative operation of the electrical machine—a connection option for an external voltage source must be provided. In principle, on-board (integrated in the vehicle) and off-board (provided separately from the vehicle) charging devices or chargers can be considered. On-board charging devices are preferred, particularly due to cost and weight savings.

Within the invention, the phases or phase connections of a first phase group in the electrical machine are now interconnected, as mentioned, and are also each connected to the respective associated half bridge via an AC switch or AC switching unit—a semiconductor switch such as a MOSFET or IGBT can be used, for example. In other words, the first phase group can thus be electrically isolated from the converter. The phases or phase connections of the second phase group (as well as any other phase groups that may be present) are each (directly) electrically connected to the respective associated half bridge. In principle, it is not excluded here that switches or other things are also provided there, however, for the relevant operation within the invention, at least in some embodiments, an electrical connection between these remaining phases and the associated half-bridge is necessary.

The AC switches, in turn, are each configured such that in a first switch position the respective phase (or phase connection) is electrically connected to the respective half bridge via the AC switch, and in a second switch position, however, the respective phase is disconnected from the respective half bridge. At least two of the AC switches are further configured such that, in the second switch position, the respective phase or phase terminal is electrically connected to an AC charging contact, wherein the AC charging contacts are set up as AC terminals or are connected to such AC terminals. As will be explained in more detail later, it is preferred if all three switches are configured accordingly, i.e., there are also three charging contacts or AC terminals.

In other words, these AC switches are thus used in particular as changeover switches that can alternately connect the first phase group to the converter or to the AC charging contacts.

An external AC voltage can then be connected to these AC charging contacts or AC voltage terminals, e.g. a power or energy supply network. This can be done, for example, via a plug that is plugged into a socket (or AC charging port in general), which in turn has the AC voltage connections. It is also conceivable that a plug is provided on the vehicle (e.g., directly connected via a cable). During operation of the electrical machine unit, the AC switches can be set (e.g. via a corresponding control device) to the first or the second switch position, depending on the operating mode (always all AC switches at the same time).

The AC switches and/or AC charging contacts can, for example, be arranged or installed inside the converter (if sufficient additional space is available there) or outside the converter. An arrangement on the housing is conceivable, for example.

Furthermore, within the invention, the DC-side terminals of the half-bridges of the second half-bridge group (i.e., those half-bridges that are assigned to the second phase group) are connected to each other and to the DC terminals via a DC switch or a DC switching unit in each case—a semiconductor switch such as a MOSFET or IGBT can be used, for example. In other words, the second half-bridge group can thus be electrically disconnected from the energy storage device. The DC-side terminals of the half-bridges of the first half-bridge group, on the other hand, are preferably connected to each other and directly to the DC terminals. In principle, it is not excluded here that switches or other things are also provided there, but for the relevant operation within the scope of the invention, at least in some embodiments, an electrical connection between the half-bridges of the second half-bridge group and the DC voltage terminals or the energy storage device is necessary.

The DC switches, in turn, are each configured such that, in a first switch position, the respective DC-side terminals of the half-bridges of the second half-bridge group are electrically connected to the respective DC terminal via the DC switch, and, in a second switch position, the respective DC-side terminals of the half-bridges of the second half-bridge group are disconnected from the respective DC terminal. The DC switches are further configured such that, in the second switch position, the respective DC-side terminals of the half-bridges of the second half-bridge group are electrically connected to a DC charging contact, the DC charging contacts being set up as DC terminals or being connected to such DC terminals. In other words, these DC switches are thus used in particular as changeover switches which can alternately connect the second half-bridge group to the DC voltage terminals or to the DC charging contacts.

An external DC voltage can then be connected to these DC charging contacts or DC voltage terminals, e.g. a power or energy supply network. This can be done, for example, via a plug that is plugged into a socket (or DC charging connection in general), which in turn has the DC voltage connections. It is also conceivable that a plug is provided on the vehicle (e.g., directly connected via a cable). During operation of the electrical machine unit, the DC switches can be set (e.g. via a corresponding control device) to the first or the second switch position, depending on the operating mode (always all DC switches simultaneously).

The DC switches and/or DC charging contacts can, for example, be arranged or installed inside the converter (if sufficient additional space is available there) or outside the converter. An arrangement on the housing is conceivable, for example.

At this point it should be mentioned that the terms AC switch and DC switch are only used according to their intended purpose, i.e. for switching the AC voltage terminals (AC stands for "Alternating Current") or for switching the DC voltage terminals (DC stands for "Direct Current"). The switches themselves can also be identical.

For operation of the electrical machine, i.e. in particular for motor and/or generator operation, the AC switches and the DC switches are set to the first switch position. This means that the phases of the first phase group are electrically connected to the associated half-bridges (as is the case for the other phases anyway); the AC charging contacts are not connected and are therefore inoperative. The half-bridges of the second half-bridge group are electrically connected to the associated DC terminals (as is true for the other half-bridges anyway); the DC charging contacts are not tethered and are thus inoperative. This thus allows usual operation, e.g. to drive the vehicle electrically or to recuperate.

For energy transfer between a connected energy storage device and an external AC voltage system—e.g. for external charging of the energy storage device from an AC voltage source as an AC voltage system or for feeding energy from the energy storage device into a consumer with an AC voltage supply as an AC voltage system—the AC switches, on the other hand, are set to the second switch position and the DC switches to the first switch position. Then an external AC voltage system, e.g. the AC voltage source, can be connected to the AC voltage terminals, e.g. by means of an appropriate charging plug. It is conceivable for this purpose, for example, that when used in a vehicle, the AC switches are automatically set to the second switch position (e.g., via a corresponding control device) when the charging plug is plugged in. However, a (possibly manual) switchover to an external charging or feed mode can also be provided.

The current flow is thus, for example, from the external AC voltage source via the AC switches into the phases of the first phase group. In the electrical machine, the phases of the first phase group are galvanically isolated from the remaining phases (typically, the three phases of each phase group are each galvanically isolated from the remaining phases). In this way, a transformer is formed so that the AC voltage applied to the phases or phase windings of the first phase group induces a corresponding AC voltage in the remaining phases—in the case of a six-phase machine, these are the remaining three phases or phase windings. Thus, the phase windings of the first phase group function as primary windings of the transformer, the remaining phase windings as secondary windings. The transformed AC voltage is then applied to the half-bridges of the second half-bridge group. In particular, the electric machine is configured such that it can be operated effectively or with sufficient efficiency in a conversion mode of electromechanical energy (mechanical to electrical and vice versa) as well as in static mode or at standstill. This allows the electrical machine to operate as a transformer with sufficient efficiency in energy conversion.

The half-bridges of the second half-bridge group, which are connected to the DC terminals via the DC switches, then act as rectifiers for charging the energy storage device or battery. Due to the galvanic isolation in the electrical machine, the AC terminals are also galvanically decoupled from the parts that are typically at high voltage, such as the power converter and battery. Here, by means of the half-bridges, the power converter can first be synchronized with the external AC voltage source, e.g. via a phase-locked loop; then the energy storage device is charged from the AC voltage source.

Both a three-phase AC voltage (with three phases in the first phase group) and a single-phase AC voltage can be used as the AC voltage or AC voltage source for charging. In the case of a three-phase AC voltage, three AC charging contacts or AC voltage contacts are required accordingly, with one phase to be connected between each two of them. In the case of a single-phase AC voltage, only two AC charging contacts or AC voltage contacts are required. The third AC switch can then also be connected to an AC charging contact, which is then not used, for example; it is also conceivable that the third AC switch does not have a wide connection in the second position.

In particular, it may also be expedient that the electric machine unit is designed for connection to both a three-phase and a single-phase AC voltage. For this purpose, for example, the AC charging connection mentioned can be designed as an adapter or have such an adapter, which can be changed as the charging voltage depending on the desired AC voltage. It is also conceivable that two AC charging connections, one for single-phase and one for three-phase AC voltage (the necessary counterparts or charging plugs are different in this case) are provided, with the AC charging contacts being connected to one or the other AC charging connection, depending on the choice made. It is also conceivable that only one specific AC charging connection is provided, but that different charging cables are used which, however, have the same plug (or socket) on the AC charging connection side, in which case not all contacts may be occupied.

An integrated charging device provided in this way also allows a power factor of the charging current to be adjusted via a control of the power converter by adjusting reactive power. The power converter can thus enable a uniform power factor or also a different, desired power factor.

A particular advantage here is also that the current flow in the phase windings of the first phase group is opposite to the current flow in the other phase windings. This means that the torques generated by these currents cancel each other out—the result is a torque of at least zero on average. Mechanical interlocking to pre-vent motor rotation is then not required.

In addition, there is no need to access the neutral point of the phases, which reduces the complexity of the design and manufacture of the electrical machine. Also, no restructuring of the phase windings (series or parallel connection of the split windings) or reconfiguration of the hardware is necessary.

In particular, the electric machine is designed to have high efficiency in energy conversion both in a conversion mode of electromechanical energy (machine rotates) and in static mode or standstill, in which it is then operated as a high-efficiency transformer. The leakage inductance of the electric machine acts as an inductive filter, reducing or smoothing current ripples, which also suppresses differential noise. Likewise, no additional power electronic components (at most the mentioned switches and possibly additional passive filters) are necessary. At most, at least a small differential common mode choke may be necessary.

Another possibility with the proposed electric machine unit is that energy from the energy storage unit can be fed into a system connected to the AC terminals, such as a power grid or other load. Also, for this purpose, the AC switches are placed in the second switch position. This can, for example, increase the stability of the power grid, increase the power quality and restore voltage in the event of grid faults.

For energy transfer between a connected energy storage device and an external DC voltage system—e.g. for external charging of the energy storage device from a DC voltage source as a DC voltage system or for feeding energy from the energy storage device into a consumer with a DC voltage supply as a DC voltage system—the AC switches are set to the first switch position, while the DC switches are set to the second switch position. Then an external DC voltage system, e.g. the DC voltage source, can be connected to the DC voltage terminals, e.g. by means of an appropriate charging plug. It is conceivable for this purpose, for example, that when used in a vehicle, the DC switches are automatically set to the second switch position (e.g., via a corresponding control device) when the charging plug is plugged in. However, a (possibly manual) switchover to an external charging or feed mode can also be provided.

The current flow is thus e.g. from the external DC voltage source via the DC switches into the half bridges of the second half bridge group. The second half-bridge group together with the first half-bridge group forms an active DC-DC converter, the phases of the second phase group together with the phases of the first phase group, which is galvanically isolated from it, form an electrical isolation.

Another possibility with the proposed electrical machine unit is that energy from the energy storage unit can be fed into a system connected to the DC terminals, such as a DC power grid or other load. Also, for this purpose, the DC switches are placed in the second switch position and the AC switches are placed in the first position. This can, for example, increase the stability of the DC power grid, increase the power quality and restore the voltage in the event of grid faults.

Furthermore, with the proposed system, it is possible to allow power transfer between an external DC system and an external AC system. Here, the AC switches are to be placed in the second switch position and the DC switches are also to be placed in the second switch position. The current flow here can be in both directions, i.e. from the DC voltage system to the AC voltage system or vice versa.

Another object of the invention is a vehicle with an electric machine unit according to the invention. This can be used as a traction drive, but other uses are also conceivable—with a smaller machine. As already mentioned, the vehicle can then have a charging connection arranged for connection to a counterpart, in particular a charging plug or charging socket, which then also has the AC voltage connections.

Further advantages and embodiments of the invention will be apparent from the description and the accompanying drawing.

The invention is illustrated schematically by means of embodiment examples in the drawing and is described below with reference to the drawing.

DETAILED DESCRIPTION

Figure 1:
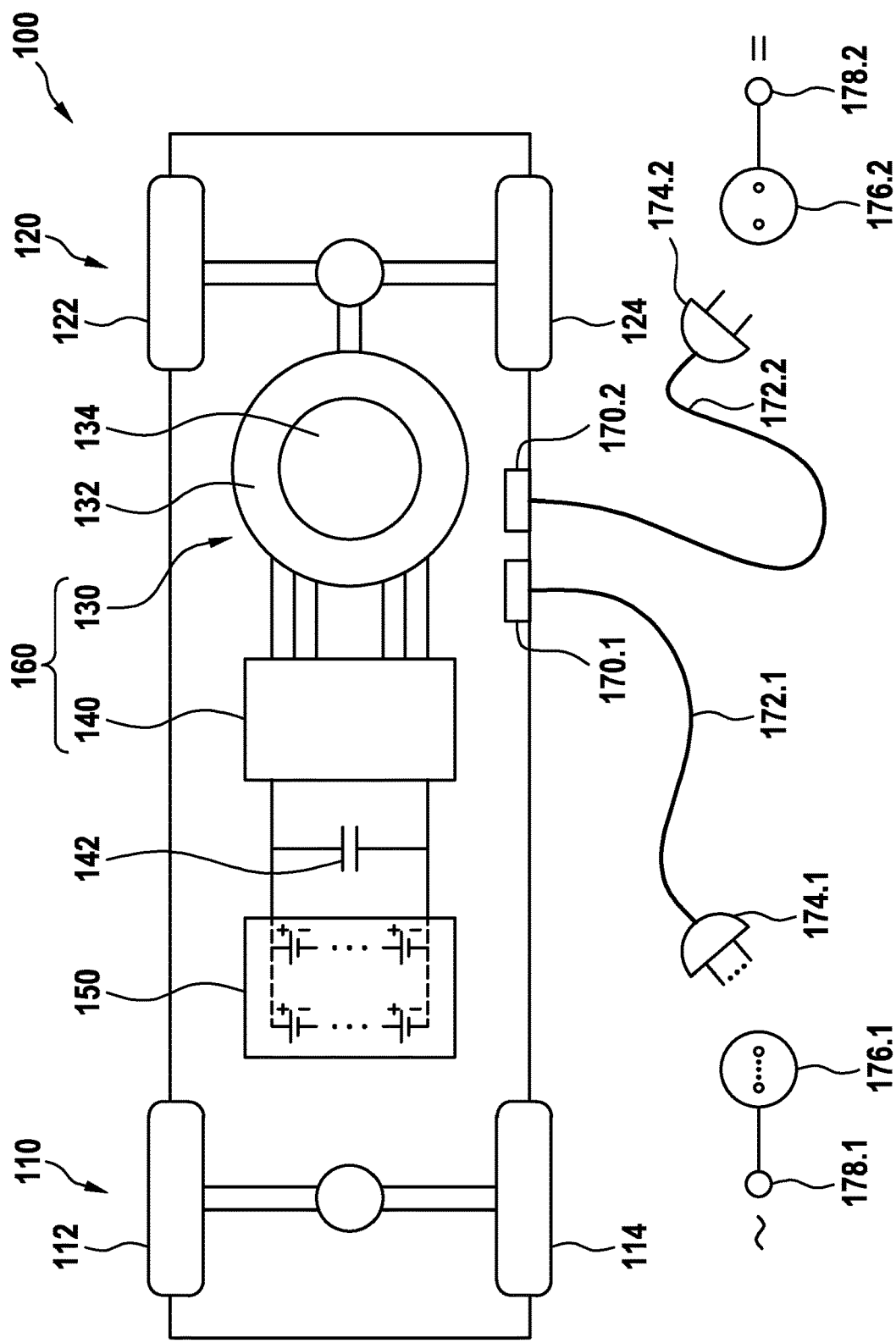
FIG. 1 shows schematically a vehicle according to the invention in a preferred embodiment.

FIG. 1 shows a roughly schematic representation of a vehicle 100 according to the invention in a preferred embodiment. The vehicle 100 has a front axle 110 with wheels 112 and 114, and a rear axle 120 with wheels 122 and 124. The rear axle 120 is driven by means of an electric machine 130 with stator 132 and rotor 134. The electric machine 130 thus serves as a traction drive.

The electric machine 130 is connected to a power converter or inverter 140 (shown here only schematically, for a more detailed illustration please refer to the figures below). The power converter 140 is in turn connected, possibly via a DC link capacitor 142, to an energy storage device 150 such as a battery. Via the power converter 140, DC voltage provided by the battery 150 can be converted into AC voltage for motor operation of the electric machine 130. Likewise, conversely, during regenerative operation of the electric machine 130, AC voltage generated there can be converted to DC voltage via the (thus bidirectional) power converter 140 to charge the battery 150.

The electric machine 130 and the converter 140 are part of an electric machine unit 160, as mentioned above.

In addition, an AC charging port 170.1 is provided on the vehicle 100, which can be connected, for example, via a charging cable 172.1 with plug 174.1 and via a socket 176.1 to an AC voltage source 178.1, e.g., a power grid, an external power supply or another AC voltage system. This may be a single-phase or multi-phase AC voltage source with a corresponding plug and socket. In this manner, the energy storage device or battery 150 can be charged. In this regard, it should be noted that the specific interconnection of the AC charging port 170.1 with the electrical machine unit 160 or the battery 150 is not shown here; for this, please refer to the following figures.

In addition, a DC charging port 170.2 is provided on the vehicle 100, which can be connected, for example, via a charging cable 172.2 with plug 174.2 and via a socket 176.2 to a DC voltage source 178.2, e.g., a power grid, an external power supply or another DC voltage system. In this way, the energy storage device or battery 150 can be charged. In this regard, it should be noted that the specific interconnection of the DC charging port 170.2 with the electric machine unit 160 or the battery 150 is not shown here; for this, please refer to the following figures.

Figure 2:
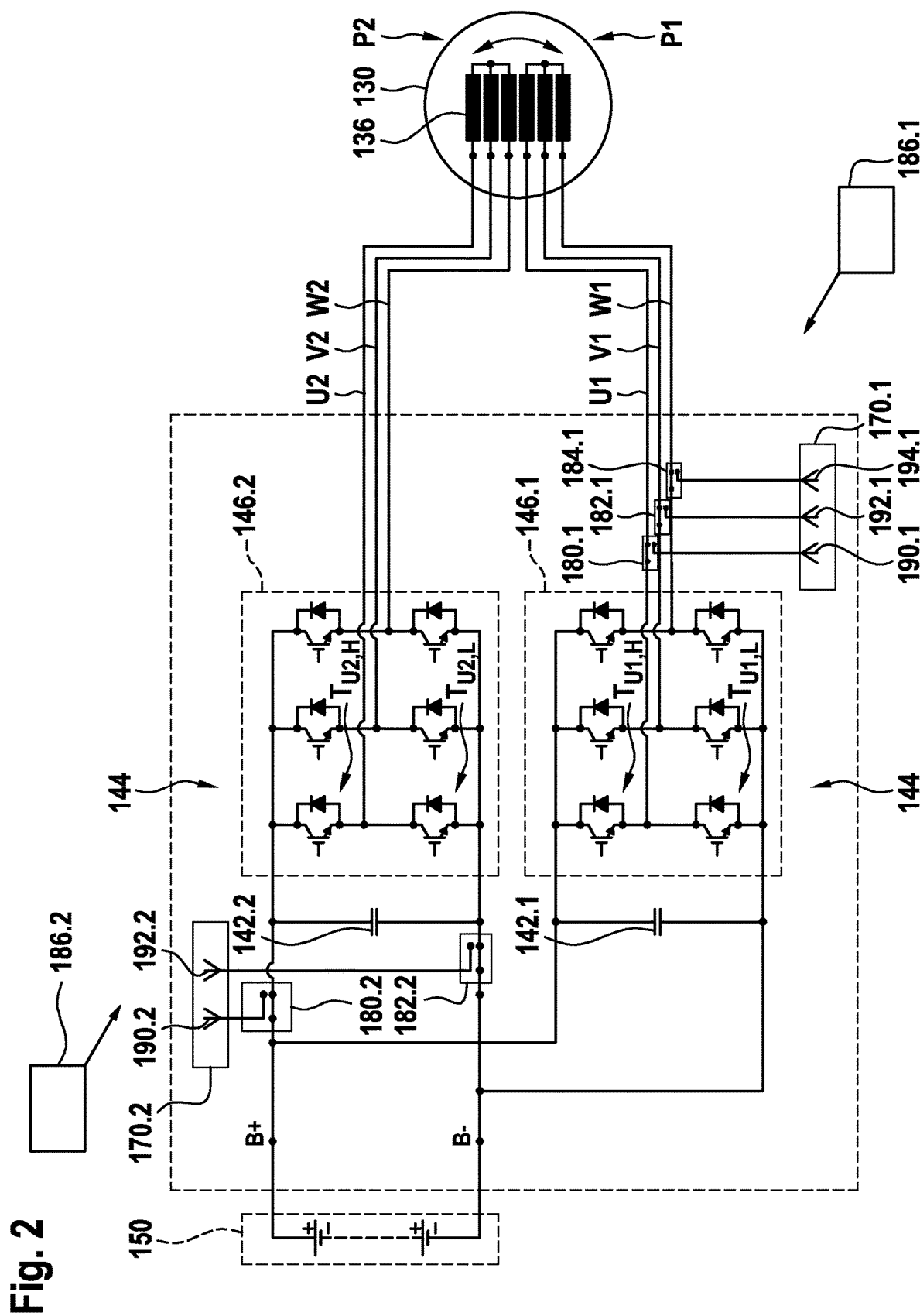
FIG. 2 schematically shows an electrical machine unit according to the invention in a preferred embodiment.

FIG. 2 schematically shows an electric machine unit 160 according to the invention in a preferred embodiment; it may be the electric machine unit 160 from FIG. 1. Also shown are the power converter 140 and the battery 150, which may also be those of FIG. 1.

For the electric machine 130, six phases U1, V1, W1, U2, V2 and W2 are shown here, each comprising a phase winding 136 (designated only once). It should be noted that the terms phase and phase winding can also be used synonymously, whereby phase winding usually means (only) the winding or coil within the stator. The phase windings 136 are part of the stator (cf. FIG. 1); the rotor is not shown here. The electric machine should be equipped with an isotropic rotor such as an induction motor (non-noise pole) or a surface mounted permanent magnet synchronous machine. The phases U1, V1, W1 form here a first phase group P1 and the phases U2, V2, W2 form a second phase group P2 (the numbering of the phase group serves here finally only the explanation).

The power converter 140 has—for the six-phase electric machine—twelve switching elements, e.g. transistors such as MOSFETS or IGBTs, with two switching elements each forming a half-bridge and being assigned to one phase. By way of example, for phase U1 the switching elements are designated $T_{U1,H}$ and $T_{U1,L}$ (highside and lowside), which form a half-bridge designated 144, with a center tap to be connected to phase U1 or its phase winding or a corresponding phase connection. For phase U2, the switching elements are designated $T_{U2,H}$ and $T_{U2,L}$, which also form a half-bridge. The same applies to the switching elements and half-bridges of the other phases, which are not designated in more detail here. The half-bridges for the first phase group P1 are combined to form the first half-bridge group 146.1, and the half-bridges for the second phase group P2 are combined to form the second half-bridge group 146.2. Each half-bridge group could also be designated as a separate converter or inverter, which then serves only one of the phase groups.

The DC-side terminals of the half-bridges of the first half-bridge group 146.1 are interconnected or connected to each other and directly connected to DC-side terminals B+ and B−. A first DC link capacitor 142.1 is connected in parallel with the DC-side terminals, and the power converter is connected to the energy storage device or battery 150 via the DC voltage terminals B+ and B−.

The half-bridges of the second half-bridge group 146.2 are here directly electrically connected to the phase windings of the second phase group P2. The half-bridges of the first half-bridge group 146.1, on the other hand, are not connected directly but via one of the AC switches 180.1, 182.1, 184.1 each to the phase windings of the first phase group P1.

The DC-side terminals of the half-bridges of the second half-bridge group 146.2 are interconnected or connected to each other and connected to the DC terminals B+ and B− via a DC switch 180.2 and 182.2, respectively. A second DC link capacitor 142.2 is connected in parallel to the DC voltage side terminals.

The AC switches 180.1, 182.1, 184.1 as well as the DC switches 180.2, 182.2 can, for example, each be arrangements with several transistors such as MOSFETs or IGBTs, whereby each switch can be brought into two different switch positions (in the manner of a toggle switch). Alternatively, the AC switches 180.1, 182.1, 184.1 as well as the DC switches 180.2, 182.2 can also be designed as electromechanical switches, for example.

Figure 3B:
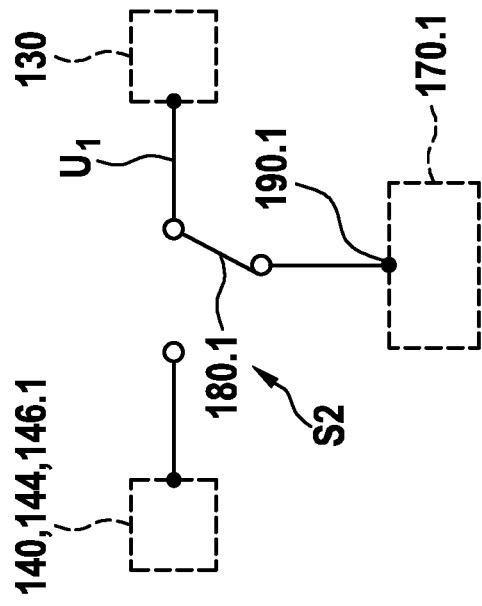
FIGS. 3a and 3b show an AC switch of the electric machine unit in various switch positions.
Figure 3A:
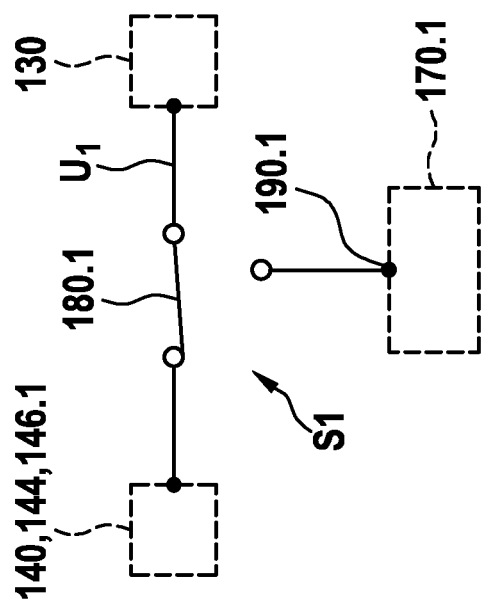

This is shown in more detail in FIGS. 3a and 3b using the example of AC switch 180.1 (shown here only schematically). In FIG. 3a, the AC switch 180.1 is in the first switch position S1, in which the phase U1 (or the corresponding phase winding) of the electrical machine 130 is electrically connected via the AC switch 180.1 to the associated half-bridge 144 in the converter 140 (first half-bridge group 146.1).

In FIG. 3b, however, the is the AC switch 180.1 in the second switch position S2, in which the phase U1 (or the corresponding phase winding) of the electric machine 130 is disconnected from the converter 140 or the half-bridge 144. Instead, the phase U1 is electrically connected via the AC switch 180.1 to an AC charging contact 190.1 that may, for example, be part of or connected to the AC charging terminal 170.1. Thus, the AC charging contact 190.1 serves as an AC voltage connection for an external AC voltage source as e.g. already shown in FIG. 1.

The same applies to the AC switches 182.1 and 184.1 which, depending on the switch position, connect the associated phase V1 or W1 to the associated half-bridge or the relevant AC charging contact 192.1 or 194.1. The charging contacts 192.1 and 194.1 may also be part of the AC charging connection 170.1 and serve as AC connections. For example, a control device or control circuit 186.1 can be used to switch the AC switches 180.1, 182.1, 184.1 between switch positions.

Figure 4B:
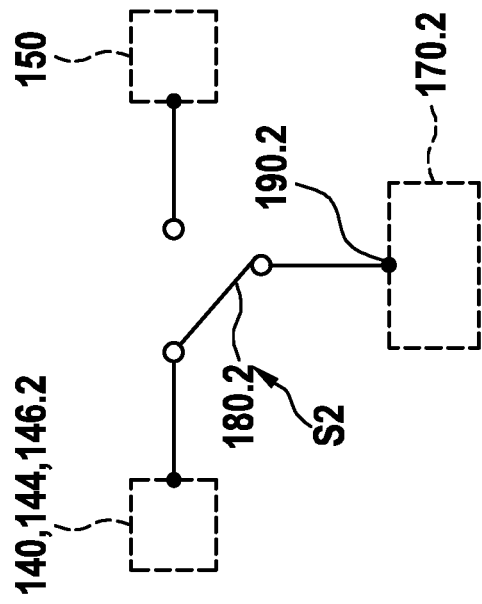
FIGS. 4a and 4b show a DC switch of the electrical machine unit in various switch positions.
Figure 4A:
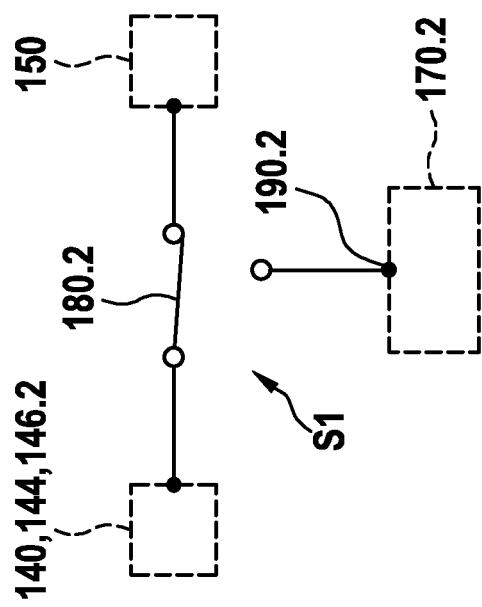

In FIGS. 4a and 4b, this is shown in more detail using the example of DC switch 180.2 (shown here only schematically). In FIG. 4a, DC switch 180.2 is in the first switch position S1, in which energy storage 150 is electrically connected to the associated half-bridge 144 in converter 140 (second half-bridge group 146.2) via DC switch 180.2.

In FIG. 4b, however, the DC switch 180.2 is in the second switch position S2, in which energy storage 150 is disconnected from the power converter 140 or the half-bridge 144. Instead, the half-bridge 144 is electrically connected via the DC switch 180.2 to a DC charging contact 190.2, which may be part of or connected to the DC charging terminal 170.2, for example. Thus, the DC charging contact 190.2 serves as a DC voltage connection for an external DC voltage source as already shown, for example, in FIG. 1.

The same applies to the DC switch 182.2 which, depending on the switch position, connects the relevant half-bridge to the energy storage device or the relevant DC charging contact 192.2. The charging contact 192.2 can also be part of the DC charging connection 170.2 and serve as a DC voltage connection. For example, a control device or control circuit 186.2 may be used to switch the DC switches 180.2, 182.2 between the switch positions.

With the situation or operating mode shown in FIG. 2—the AC and DC switches are each in the first switch position—regular operation of the electric machine 130, both motor and generator, is possible.

Figure 5:
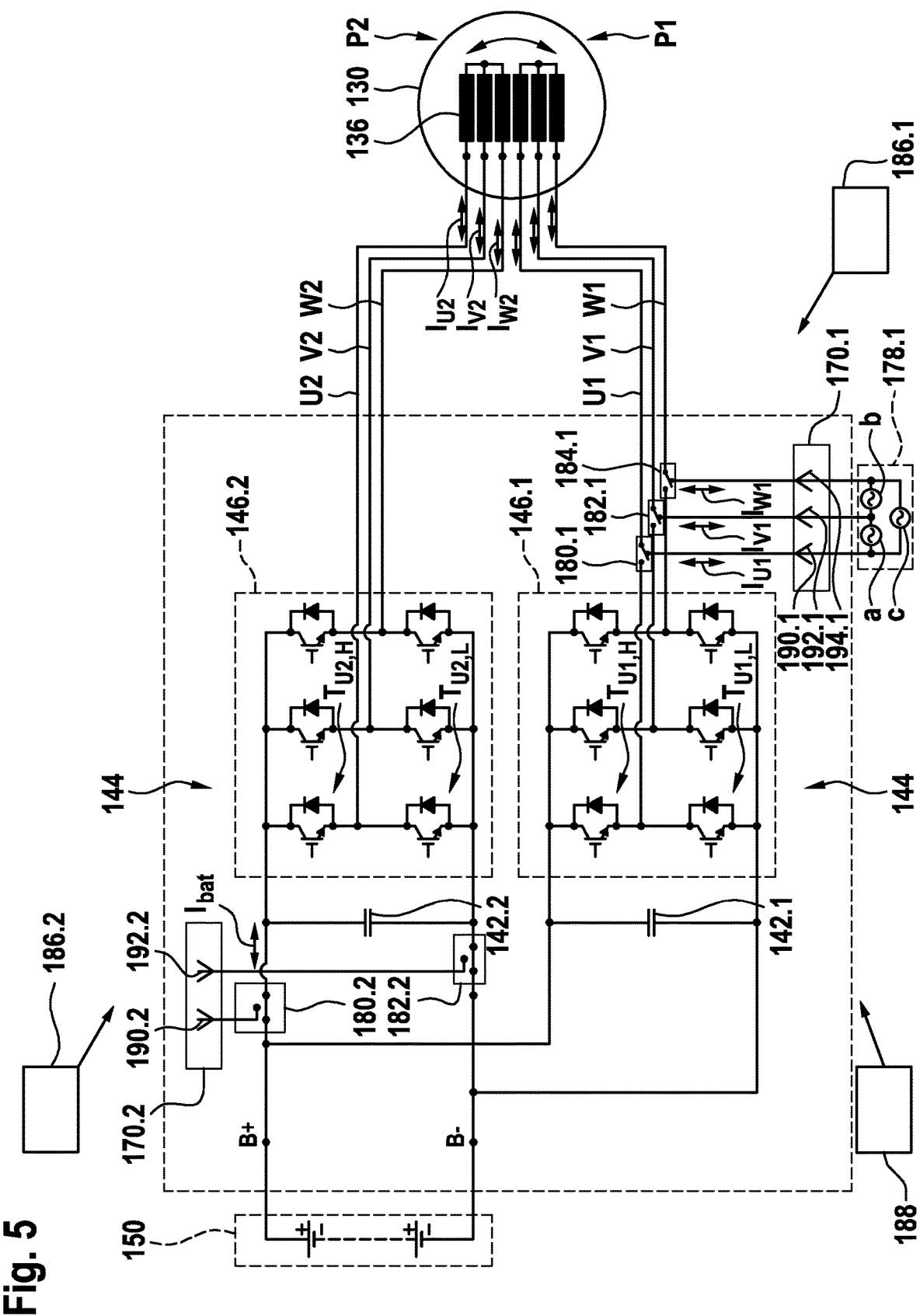
FIG. 5 shows the electrical machine unit of FIG. 2 in another operating mode.

In FIG. 5, the electrical machine unit 160 of FIG. 2 is shown in a different mode of operation, namely a power transfer between the battery and the AC source, e.g. an external charging of the battery 150. The electrical machine unit 160 corresponds to that of FIG. 2, so that not all components are designated again here; in this respect, reference can be made to FIG. 2 and the associated description. However, the AC switches are each in the second switch position, whereas the DC switches are in the first switch position.

An AC voltage source 178.1 is now connected to the AC charging terminal 170.1 (cf. also FIG. 1), namely a three-phase AC voltage source with the three phases a, b and c. The phase a is connected between the charging contacts or AC voltage terminals 190.1 and 192.1—and thus the phases U1 and V1 of the electric machine. Phase a is connected between the charging contacts or AC voltage terminals 190.1 and 192.1—and thus the phases U1 and V1 of the electrical machine. Phase b is connected between the charging contacts or AC voltage terminals 192.1 and 194.1—and thus phases V1 and W1 of the electrical machine. Phase c is connected between the charging contacts or AC voltage terminals 190.1 and 194.1+—and thus phases U1 and W1 of the electrical machine.

Instead of the delta connection, the three phases a, b, c, of the AC voltage source can also be connected in a star connection.

Thus, in phases U1, V1, W1, a current $I_{U1}$, $I_{V1}$ and $I_{W1}$ flows through the phase windings of the first phase group P1. These are interconnected and serve as the primary winding of a transformer, while the phase windings of the second phase group P2, which are galvanically isolated from the first and also interconnected, serve as the secondary winding. Thus, a current $I_{U2}$, $I_{V2}$ and $I_{W2}$, respectively, flows in the phases U2, V2, W2 and is induced accordingly.

By means of a control unit 188 (for charge control), the first half-bridge group 146.1 of the half-bridges can be controlled for this purpose in such a way that they act as an active rectifier to charge the battery 150 with a current $I_{bat}$. As mentioned above, synchronization with the AC voltage source can be performed first. The level of the voltage can also be adjusted in this way.

Figure 6:
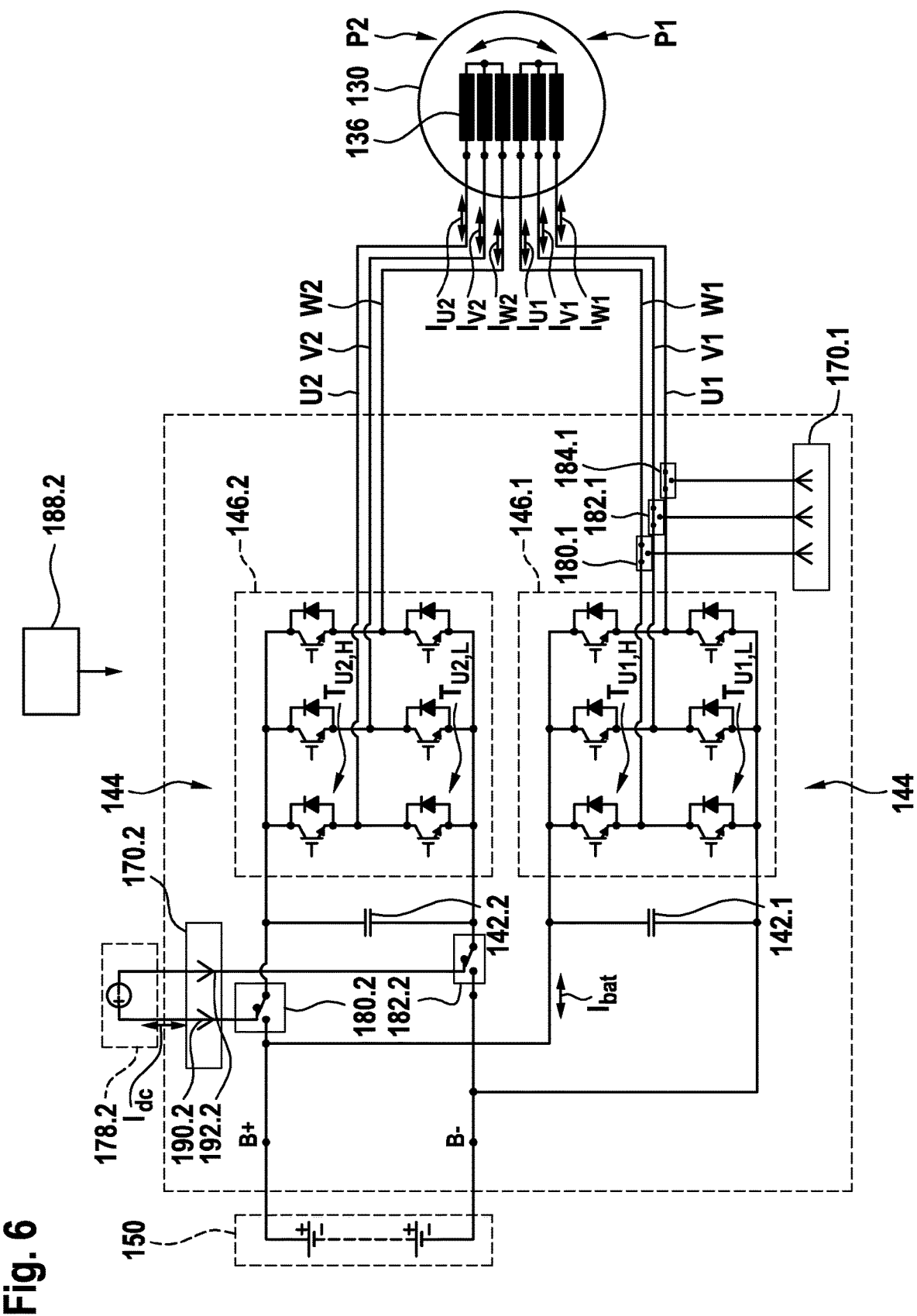
FIG. 6 shows the electrical machine unit of FIG. 2 in another mode of operation.

In FIG. 6, the electrical machine unit 160 of FIG. 2 is shown in a different mode of operation, namely a power transfer between the battery and the DC voltage source, e.g. an external charging of the battery 150. The electrical machine unit 160 corresponds to that of FIG. 2, so that not all components are designated again here; in this respect, reference can be made to FIG. 2 and the associated description. However, the AC switches are each in the first switch position, whereas the DC switches are in the second switch position.

A DC voltage source 178.2 is now connected to the DC charging terminal 170.2 (see also FIG. 1), namely between the DC charging contacts or DC voltage terminals 190.2 and 192.2.2 and 192.2. Thus, a current $I_{dc}$ flows to the second half-bridge group 146.2, in phases U2, V2, W2 a current $I_{U2}$, $I_{V2}$ and $I_{W2}$, respectively, in phases U1, V1, W1 a current $I_{U1}$, $I_{V1}$ and $I_{W1}$, respectively, which is induced. A current $I_{bat}$ then flows into the battery from the first half-bridge group.

By means of a control unit 188.2 (for charge control), the first and second half-bridge groups 146.1, 146.2 can be controlled for this purpose in such a way that they act as DC-DC rectifiers to charge the battery 150 with the current $I_{bat}$.

Figure 7:
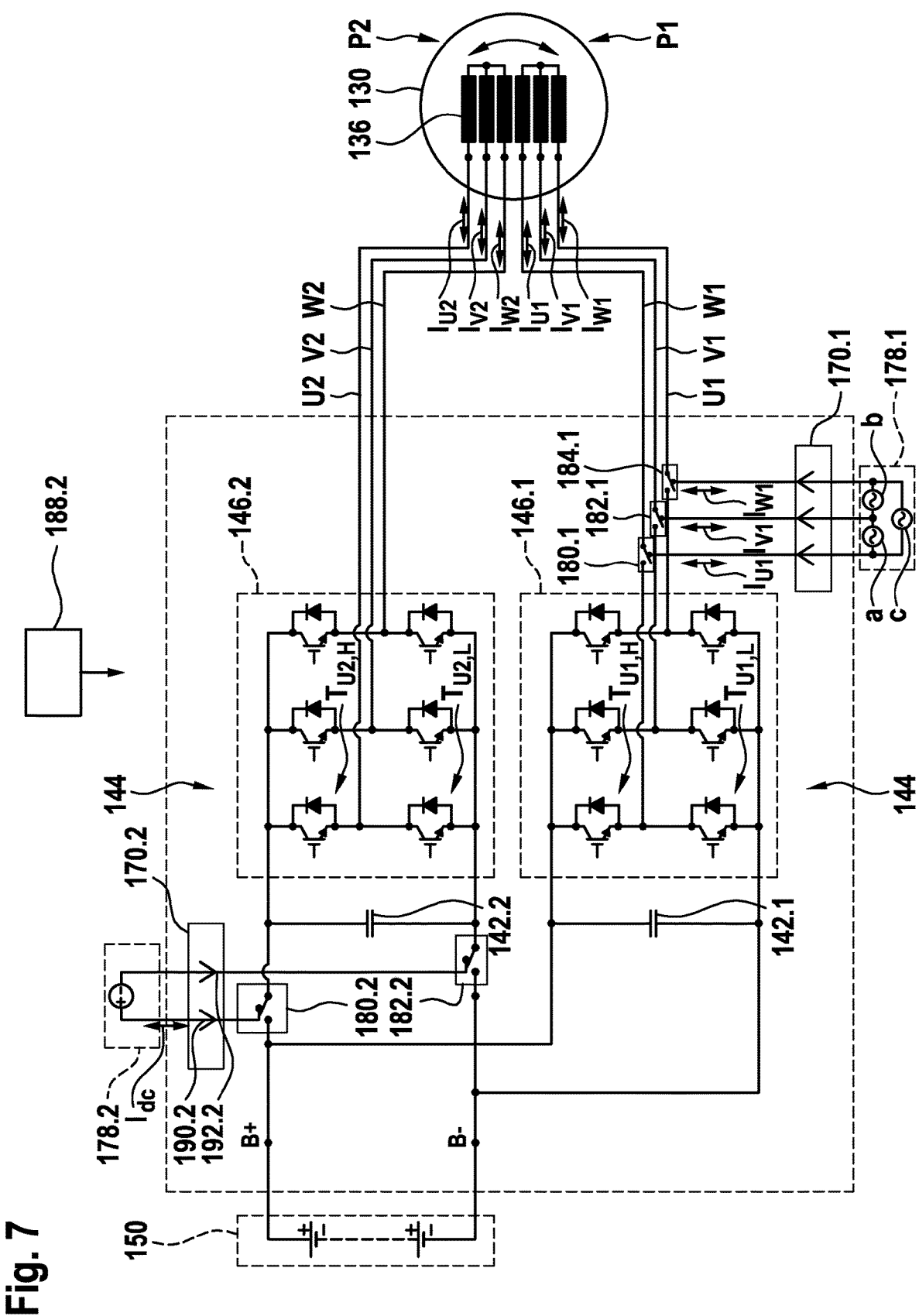
FIG. 7 shows the electrical machine unit of FIG. 2 in another operating mode.

In FIG. 7, the electrical machine unit 160 of FIG. 2 is shown in a different mode of operation, namely a power transfer between the DC voltage source and the AC voltage source. The electrical machine unit 160 is the same as that shown in FIG. 2, so that not all of the components are re-described here; in this respect, reference may be made to FIG. 2 and the accompanying description. However, the AC switches are each in the second switch position, and the DC switches are also in the second switch position.

A DC voltage source 178.2 is connected to the DC charging terminal 170.2 (cf. also FIG. 1), namely between the DC charging contacts or DC voltage terminals 190.2 and 192.2. An AC voltage source 178.1 is connected to the AC charging terminal 170.1 (cf. also FIG. 1), namely a three-phase AC voltage source with the three phases a, b and c as already shown in FIG. 5.

Thus, a current $I_{dc}$ flows to the second half-bridge group 146.2, in phases U2, V2, W2 a current $I_{U2}$, $I_{V2}$ and $I_{W2}$, respectively, in phases U1, V1, W1 a current $I_{U1}$, $I_{V1}$ and $I_{W1}$, respectively, is induced. From there, the current then flows to the AC voltage source 178.1.

By means of a control unit 188.2, the first and second half-bridge groups 146.1, 146.2 can be controlled for this purpose in such a way that they act as DC-DC rectifiers.

The invention claimed is:

1. An electric machine unit having an electric machine with two phase groups of at least one phase each and having a converter, the converter having two half-bridge groups of in each case at least one half-bridge, each phase group being assigned one half-bridge group, so that one half-bridge is provided for each phase connection of the electric machine, the converter having DC voltage connections which are configured for connection to an energy storage, wherein the phase connections of a first phase group of the two phase groups in the electric machine are connected to one another and are each connected via an AC switch to the respectively associated half bridge of a first half bridge group of the two half bridge groups, at a center tap of the respective half bridge, wherein the phase connections of a second phase group of the two phase groups are connected to one another and are each connected to the respectively associated half bridge of a second half bridge group of the two half bridge groups, at a center tap of the respective half bridge, where DC-side terminals of the half-bridges of the second half-bridge group are connected to each other and to the DC terminals via a DC switch in each case, wherein each AC switch is configured such that in a first switch position the respective phase terminal is electrically connected to the respective half bridge via the switch, and in a second switch position the respective phase terminal is disconnected from the respective half bridge, wherein at least two of the AC switches are further configured such that in the second switch position the respective phase terminal is electrically connected to an AC charging contact, wherein the AC charging contacts are set up as AC terminals or are connected to such, and each DC switch being configured such that, in a first switch position, the respective DC-voltage-side terminals of the half-bridges of the second half-bridge group are electrically connected to the respective DC voltage terminal via the DC switch, and, in a second switch position, the respective DC-voltage-side terminals of the half-bridges of the second half-bridge group are disconnected from the respective DC voltage terminal, the DC switches further being configured such that, in the second switch position, the respective DC-side terminals of the half-bridges of the second half-bridge group are electrically connected to a DC charging contact, the DC charging contacts being set up as DC terminals or being connected to such DC terminals.

2. The electric machine unit according to claim 1, wherein the phases of the first phase group are galvanically separated from the phases of the second phase group.

3. The electric machine unit according to claim 1, wherein DC-side terminals of the half-bridges of the first half-bridge group are connected to each other and directly to the DC terminals.

4. The electric machine unit according to claim 1, wherein the two phase groups each have three phases and three phase connections and wherein all three AC switches are configured such that in the second switch position the respective phase connection is electrically connected to a charging contact.

5. The electric machine unit according to claim 1, wherein the power converter is bidirectional.

6. The electric machine unit according to claim 1, further comprising a control device configured to selectively bring the AC switches into the first switch position or into the second switch position, and/or comprising a control device arranged to selectively bring the DC switches into the first switch position or into the second switch position.

7. The electric machine unit according to claim 1, configured as a traction drive of a vehicle.

8. A vehicle with an electric machine unit according to claim 1 and with an energy storage, in particular a battery, which is electrically connected to the DC terminals of the converter.

9. The vehicle according to claim 8, further comprising an AC charging port, which is configured for connection to a counterpart, in particular a charging plug or a charging socket, and which comprises the AC terminals, and/or a DC charging port, which is configured for connection to a counterpart, in particular a charging plug or a charging socket, and which comprises the DC terminals.

10. A method of operating an electric machine unit according to A method of operating an electric machine unit according to wherein the AC switches and the DC switches are brought in the first switch position or in the second switch position, depending on the operating mode.

11. The method according to claim 10, wherein for operation, in particular motor and/or generator operation, of the electric machine the AC switches and the DC switches are brought into the first switch position.

12. The method according to claim 10, wherein for energy transfer between a connected energy storage and an external AC system, the AC switches are placed in the second switch position and the DC switches are placed in the first switch position, wherein in particular the external AC system is connected to the AC terminals.

13. The method according to claim 10, wherein for energy transfer between a connected energy storage and an external DC voltage system, the AC switches are brought into the first switch position and the DC switches are brought into the second switch position, wherein in particular the external DC voltage system is connected to the DC voltage terminals.

14. The method of claim 13, wherein by means of the half-bridges of the second half-bridge group, the converter is first synchronized with the external AC system, and then the power is transferred between the energy storage and the AC system.

15. The method according to claim 10, wherein for power transfer between an external DC system and an external AC system, the AC switches are brought in the second switch position and the DC switches are brought in the second switch position, wherein in particular the external DC system is connected to the DC terminals and the external AC system is connected to the AC terminals.

* * * * *